United States Patent [19]
Burgess

[11] Patent Number: 4,686,331
[45] Date of Patent: Aug. 11, 1987

[54] DIGITIZING METHOD AND APPARATUS FOR COMPENSATING CURSOR OF STYLUS VELOCITY ERRORS

[75] Inventor: Ken L. Burgess, Ft. Collins, Colo.

[73] Assignee: Hewlett-Packard Company, Palo Alto, Calif.

[21] Appl. No.: 855,221

[22] Filed: Apr. 23, 1986

[51] Int. Cl.$^4$ ............................................. G08C 21/00
[52] U.S. Cl. ...................................................... 178/19
[58] Field of Search .............. 178/18, 19; 340/870.31; 364/520; 371/1

[56] References Cited
U.S. PATENT DOCUMENTS
4,552,991 11/1985 Hulls ..................................... 178/19

Primary Examiner—Stafford D. Schreyer
Attorney, Agent, or Firm—Edward L. Miller

[57] ABSTRACT

A digitizer measuring abscissas and ordinates at separate times compensates these coordinates for errors created by cursor or stylus motion during the digitizing process. At the highest level of operation this is achieved by altering the coordinate measurement sequence to be abscissa, ordinate, abscissa, and then associating the ordinate with the average of the two abscissas. Two ordinates separated by an intervening abscissa could be used as well. At a lower level a similar alteration in measurement procedure allows for correction of errors in the determination of coarse values from pairs of fine values $X'$ and $X''$ or $Y'$ and $Y''$ by application of the principle of the vernier. When cursor motion is present the two fine values of a pair do not correspond to the same point. This is overcome by measuring $X'$, $X''$, and $X'$ and associating $X''$ with the average of the two $X'$ values to find the coarse X value. The same is done with $Y'$, $Y''$ and $Y'$ to find the coarse Y value.

7 Claims, 7 Drawing Figures

DIGITIZING METHOD AND APPARATUS FOR COMPENSATING CURSOR OF STYLUS VELOCITY ERRORS

BACKGROUND AND SUMMARY OF THE INVENTION

The present invention relates to an improvement for a certain class of digitizers. The improvement allows increased digitizing accuracy while the cursor or stylus is in motion over the platen or digitizing surface. In general, the invention pertains to the class of digitizers wherein the X (abscissa) and Y (ordinate) coordinates are measured in alternation and at separate times. It also applies to a particular type of coordinate measurement technique wherein the individual X or Y measurements are themselves each compounded of two component measurements performed separately and in sequence.

The evil that arises in the general case of alternating separate X and Y measurements is that the motion of the stylus or cursor can create a situation where the reported (X, Y) coordinates do not lie on the actual path taken by the stylus. One solution to this problem is discussed in U.S. Pat. No. 4,255,617 issued to Carau, et. al. FIGS. 19 through 21 of that patent address the problem and one solution thereto. The solution described in Carau's FIGS. 20 and 21 is to find the cursor velocity in one coordinate direction, and correct the value of that coordinate by the amount of cursor travel during the time required to measure the other coordinate. It would be desirable in the interests of speed and simplicity to achieve a comparable correction to the measured coordinates without resorting to actually finding the velocity. The instant invention accomplishes this objective by altering the measurement sequence to be X, Y, X (or perhaps Y, X, Y) and simply averaging the first and third measurements. This produces a value that is correctly associated with the middle intervening measurement, provided that the existence of certain conditions can be assured. These include uniform cursor motion (which will be assumed) and equal measurement times for each of the measured X and Y values.

The invention is also applicable at a different level to a particular type of coordinate measurement technique. In a digitizer using such a technique, each coordinate (say, X) is compounded from two similar components (say, X' and X''). X' and X'' are not "coarse" and "fine," as in some digitizing techniques. Instead, they are both high resolution fine measurements, a comparison of which determines the number of modulo fine values to be added to the fine component (which could be either of X' or X''). This measurement technique will be set out in more detail in a later portion of the Specification. In summary, however, it may be pointed out that stylus motion disturbs the validity of the X' and X'' measurement pair in much the same way that it introduces a dissimilarity between X and Y: X' is no longer correctly associated with X'' because they were measured at different times. This difficulty is overcome by modifying the component measurement sequence for X to be X', X'', X', and then associating X'' with the average of the two X' values. The same is also done for Y: the measured Y components are Y', Y'', Y', and Y'' is associated with the average of the two Y' values.

DESCRIPTION OF A PREFERRED EMBODIMENT

Figure 1:
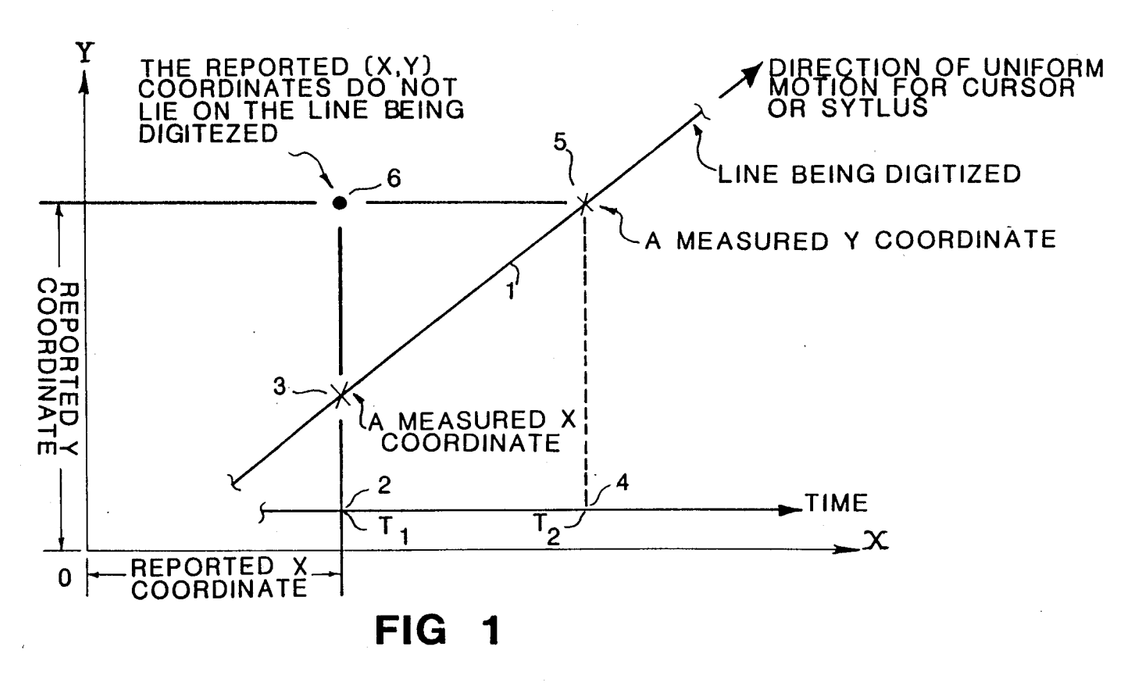
FIG. 1 illustrates how the motion of a cursor or stylus can cause a digitizer to produce coordinates that do not lie along the line being digitized.

FIG. 1 shows how a digitizer that separately measures individual abscissa components and individual ordinate components can produce a coordinate pair that describes a point not upon the line describing the path of a moving stylus or cursor. It is clear that what is meant by "separately" in this instance is "at different times." It is not hard to understand why this effect arises. When an (X, Y) coordinate pair represents a moving object the values of X and Y are each functions of time. For a straight path not parallel to one of the coordinate axes, the coordinate pair represents a point along the path of the moving object at time T if and only if X and Y are each functions of the same value of T. But in many digitizers the same electronic measurement means, or a substantial portion thereof, is used first to measure one coordinate (ordinate or abscissa) and then, at a later time, to measure the remaining coordinate. This guarantees that each are functions of *different* values of T. Accordingly, if the stylus or cursor is in motion, the reported coordinate pair describes a point that does not lie upon the path digitized.

FIG. 1 illustrates a particular hypothetical instance of the phemonenon explained above. A cursor or stylus (not shown) moves uniformly along a line being a line 1 being digitized. At a time 2 $T_1$ the abscissa of a point 3 on the line 1 is measured. At a later time 4 $T_2$ the ordinate of another point 5 is measured. The point having the measured abscissa and measured ordinate is the point 6, which does not lie on the line 1.

Figure 2:
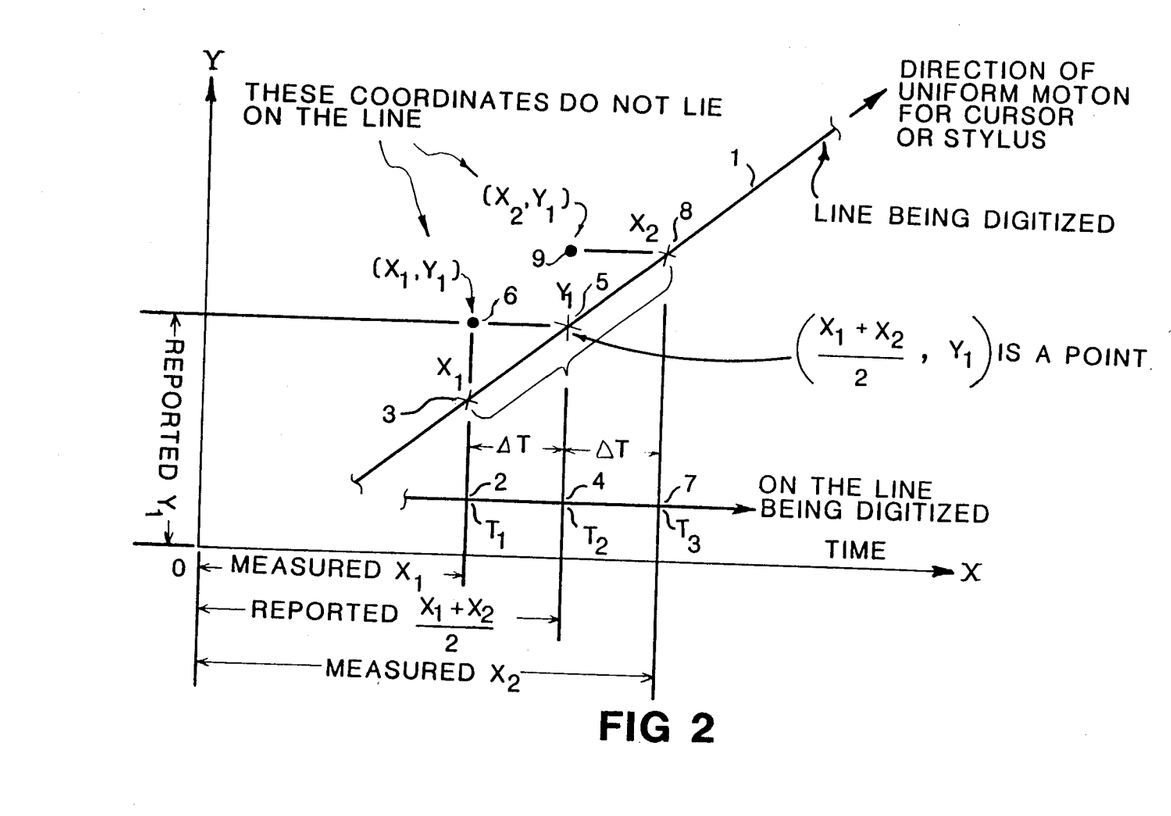
FIG. 2 illustrates how the problem of motion-shifted coordinates can be solved by altering the measurement sequence of the individual components of the coordinates in conjunction with simple averaging of selected ones of those components.

FIG. 2 describes a solution to the problem of cursor motion in digitizers that measure an abscissa and its associated ordinate at different times. According to the figure, the solution is to measure at a first time a first instance of a first individual coordinate (say, the abscissa), measure at a second time delta T later the value of the second individual coordinate (the ordinate), and then at a third time delta T later than that, measure a second instance of the first individual coordinate. The first and second instances of the first individual coordinate are then averaged to produce a value whose associated value of T is the same ("a second time delta T later") as that when the value of the second individual coordinate was measured. This equality obtains if individual coordinate measurement always takes the same amount of time, is repeated at regular intervals, and the motion of the cursor in the vicinity of the measurements is closely approximated by uniform motion along a straight line. The first two conditions can be met according to certain aspects of the internal architecture and operation of a digitizer. Not all digitizers meet these requirements, but many different digitizing techniques are compatible with those requirements. The third condition (that of uniform motion along an approximating straight line) essentially revolves around the velocity of the cursor in the directions of the different axes in relation to the separation in time between the individual coordinate measurements, as observable through the resolution of the measurements. Obviously, if the separate measurements are sufficiently close together in time so that, for the fastest expected cursor velocity, the digitizer's resolution does not permit a distinction between the correct answer and the erroneous one, the problem does not rise to a level needing a solution. In point of fact, many a digitizer has sufficient resolution (0.001 inches) at its sampling rates to reveal inaccuracies arising from merely modest cursor velocities, say five to ten inches per second. These kinds of velolcities could easily be encountered in an interactive graphics application.

In FIG. 2 the absicssas are shown as being the "first individual coordinate," and are measured twice about an intervening ordinate and then averaged. It clearly could also be the other way around; one could measure an ordinate, and intervening abscissa, another ordinate, and then average the two ordinate values to obtain an equivalent ordinate to put with the measured abscissa. One could even do one or the other, depending upon which axis had the least cursor velocity. In some embodiments it may be desirable to measure the intervening coordinate in the axis having the least velocity.

The technique of averaging two consecutive abscissas to go with an intervening ordinate (or the other way around) lends itself quite well to use in digitizers controlled by a microprocessor. In those sorts of systems the measurement hardware makes individual coordinate or coordinate component measurements upon the command of, or under the direction of, the microprocessor. With little or no change to the measurement hardware many such digitizers could be modified to report accurate coordinates of a moving stylus; it would be sufficient to change the control and processing algorithms expressed in the ROM's from which the microprocessor is controlled. The digitizer to be discussed in connection with the remaining figures is such a digitizer. In that digitizer the measurement hardware simply provides X component information (in the form of X' and X" information) or similar Y component information in a sequence and at times determined by the microprocessor. The microprocessor manipulates and combines the results, including the averaging.

In particular then, FIG. 2 illustrates how, according to the invention, the abscissa $X_1$ of a point 3 along a line 1 is measured at a time 2 $T_1$. At a time 4 $T_2$ delta T later the ordinate $Y_1$ of a point 5 is measured. As explained in connection with FIG. 1, this produces the coordinate pair ($X_1$, $Y_1$) describing a point 6. Point 6 does *not* lie upon the line 1 being digitized. However, according to the invention the digitizer does not report the coordinates of point 6. Instead, at a point 7 in time $t_3$ delta T later than $T_2$ the digitizer measures the abscissa $X_2$ of a third point 8 along the line 1. This produces coordinates ($X_2$, $Y_1$) for another point 9 that, like point 6, also fails to lie upon the line 1. Accordingly, the coordinates of point 9 are not reported, either. The abscissa that *is* reported is one half the sum of $X_1$ and $X_2$, and the ordinate that is reported is $Y_1$. These coordinates describe a point 5 which *does* lie upon the line 1.

Figure 3:
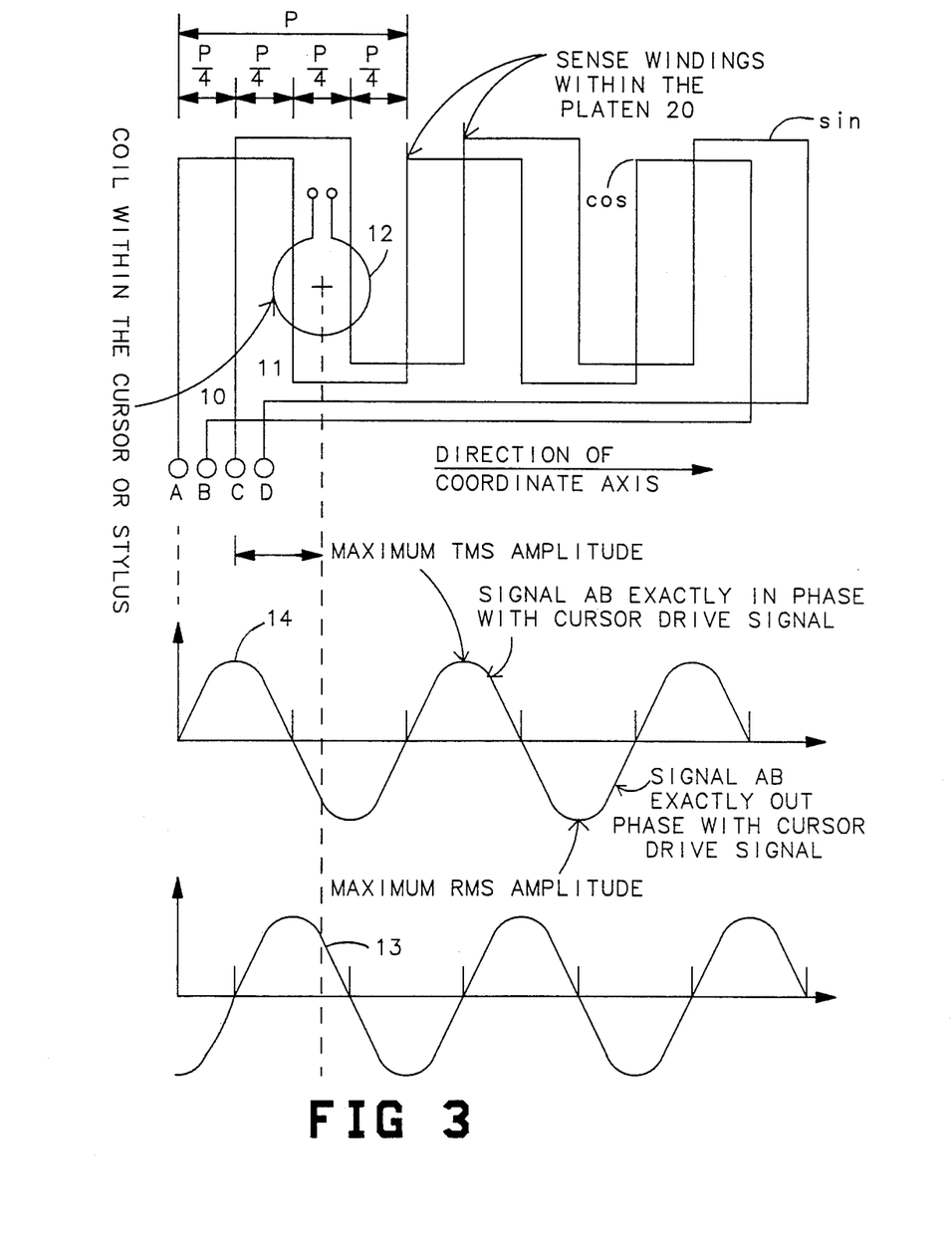
FIG. 3 is a simplified partial explanation of the principle of operation for one particular type of digitizer to which the invention is applicable.

We now turn to FIG. 3 and begin a brief description of one particular digitizing technique that combines individual components (i.e., some sort of X' and X") to produce an individual coordinate (an X). Our aim will be to show how it is that cursor or stylus motion disturbs the agreement between X' and X", and to show how the invention resolves the disagreement. We begin by examining one particular digitizing technique to learn what its X' and X" are.

According to FIG. 3 the digitizing surface or platen 20 has embedded within it a number of sense windings. Suppose for a moment that the digitizer needed to report coordinate values along only one particular axis. Now consider sense windings 10 and 11. In a manner already known, each winding traverses the particular axis as a series of oppositely directed half-turns in directions perpendicular to the particular axis. Two consecutive half-turns define a period, which is typically on the order of one inch. The two sense windings 10 and 11 lie one above the other, in essentially the same plane, but are physically displaced along the particular coordinate axis by one quarter of a period. The movable cursor or stylus includes a coil 12 that is driven with a periodic ac signal. In FIG. 3 the drive circuitry is not shown, but a typical cursor drive frequency would be thirty kilohertz at an amplitude sufficient to produce a signal of useful amplitude in the sense windings 10 and 11. The coupling of the coil 12 to the sense winding 10 produces an ac signal between terminals A and B. A similar ac signal is produced by sense winding 11 at terminals C and D.

The AB signal and the CD signal are similar in several respects. Each is a sinusiodal signal of the same frequency as the signal driving the coil 12. Each is either exactly in phase with the drive signal or exactly out of phase with the drive signal, depending upon which half-turn effectively contains the drive coil 12. That is, their phasings relative to the drive signal depend upon the position of the cursor or stylus. But these signals do not have a constant rms amplitude. Nature extracts a price for the abrupt half-cycle change of phase occurring in signal AB as the drive coil 12 moves from one half-turn of sense winding 10 into the next. That price is that the rms amplitude of the signal AB mus gradually approach zero as the center of the coil 12 approaches the conductor of which th half-turn consists. A simple cancellation argument explains why this happens. Thus, the rms amplitude of signals AB and CD are each sinusoidal functions of the position of the drive coil 12. Sine wave 14 in FIG. 3 illustrates the variation in rms value of signal AB as a function of cursor or stylus motion. Sine wave 13 is the same result for signal CD. Both waveforms 13 and 14 are sinusoids, but they are in quadrature; that is, they are ninety degrees out of phase. This property arises from the spatial displacement of one quarter of a period (one half of a half-turn) between the sense windings 10 and 11.

It is important not to confuse the sinusoids 13 and 14 with the actual sinusoidal signals AB and CD. Sinusoids 13 and 14 do not vary in rms amplitude; signals AB and AC do. Sinusoids 13 and 14 are not themselves actual signals found in the digitizer, but are simply graphs indicating, as a function of displacement, the relative RMS amplitude and phase variations of signals that *are* found there. (Graphs of signals AB and CD would be of instantaneous voltage versus time.) The frequency of signals AB and CD is the same as that of the cursor drive signal. The "frequency" of waveforms 13 and 14 would be a function of how fast the cursor or stylus were moving across the surface of the platen, if indeed it were.

We are interested in how signals AB and CD can be combined to produce a result whose phase varies linearly as a function of drive coil 12 displacement. With that we could measure a fine (modulo) value of the distance from the effective center of the drive coil 12 to the edge of the whole turn of the sense winding containing it. If we then knew what whole turn of the sense winding the drive coil were in we could produce the actual absolute distance coordinate along the axis.

It is not productive to simply add signal AB to signal CD. This is because an easily proved theorem states that if two signals of the same frequency are either exactly in phase or exactly out of phase with a reference, then so is their sum. To see this, consider where the zero crossings are for each addend; they occur simultaneously in time. Those same points in time will also be the zero crossings of the sum. Clearly, the phase of the sum will be that of the larger addend.

However, if we shift the phase one of signals AB and CD by ninety degrees and *then* add, it can be shown that the sum is now a signal of constant rms amplitude whose phase, relative to the ac drive signal, varies linearly as a function of the displacement of drive coil 12 along the axis. Since this technique is used by various digitizers, we omit the formal proof of this in favor of the following characterization. Once one of the signals is phase shifted the zero crossings no longer occur simultaneously in time. Instead, the locations of the zero crossings in the sum will be the result of the addition of generally oppositely signed instantaneous values of voltage. Thus, the locations of the zero crossings in the sum will shift one way or the other, depending upon the location of the next zero crossing in the larger signal a that signal "swamps out" the smaller signal. The sum is a signal whose phase varies according to the relative amplitude of signals AB and CD, which in turn is a function of cursor or stylus position. The rms amplitude of the sum is constant because as one signal is increasing in rms amplitude the other is decreasing in a complimentary manner.

Figure 4:
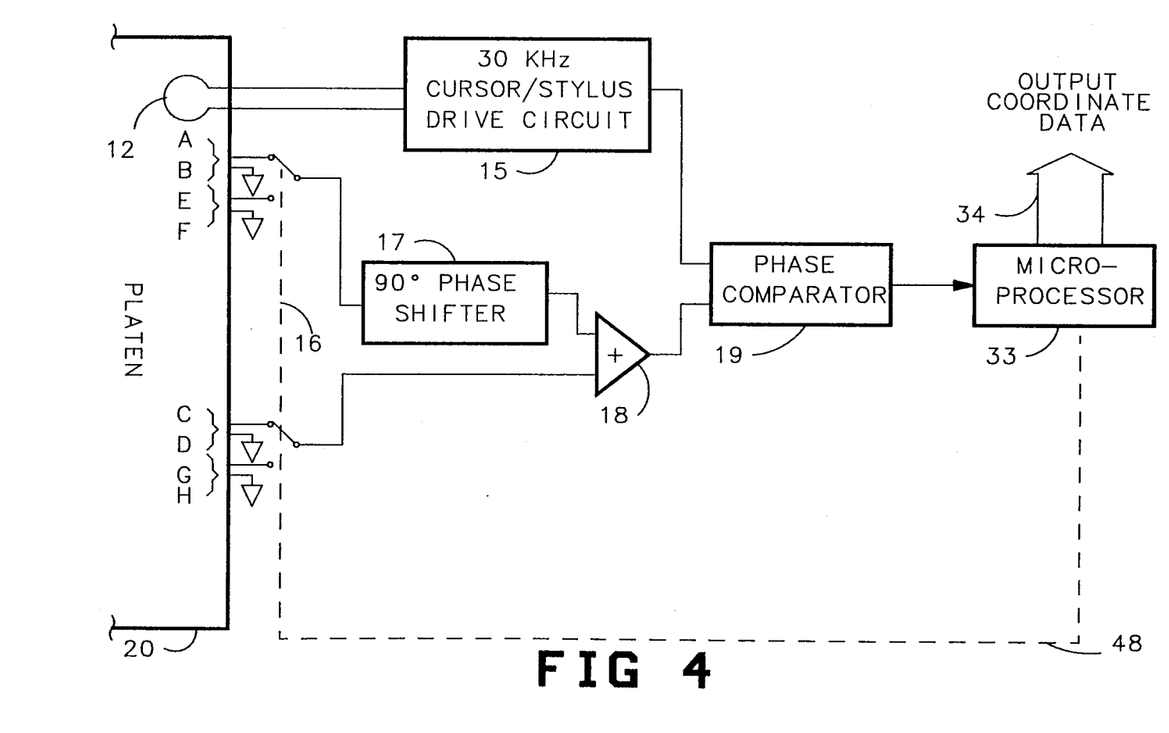
FIGS. 4 and 5 are further simplified partial explanations of the digitizing principle set out in FIG. 3.

FIG. 4 shows in simplified block diagram form exemplary circuitry to produce the sum of the phase-shifted signals from the sense windings 10 and 11. Any preamplifier and signal conditioning circuitry has been omitted. According to the figure, a cursor/stylus drive circuit 15 is coupled to the coil 12 and to a phase comparator 19. As described in connection with FIG. 3 coil 12 is magnetically coupled to the sense windings 10 and 11 (not shown in FIG. 4) that are embedded within the platen 20. A multiplexing, or switching, device 16 connects various ones of the sense winding terminals to a ninety degree phase shifter 17 and to a summing circuit 18. For now, ignore terminals E, F, G, and H, and assume that switch 16 makes the particular connections shown. If terminals A, B, C, and D produce X', then terminals E through H will produce X" in a manner to be described in connection with FIG. 5. A misconception to avoid is that terminals E–H are for the other axis. This is not so; eight terminals are required per axis. If FIG. 4 shows abscissa measurement, then *eight more* terminals would be required for the ordinate, along with a corresponding doubling in the number of throws for switch 16. The setting of switch 16 is controlled by a microprocessor, in accordance with whether X' or X" is to be measured. The details of this control have been omitted in favor of the functional relationship illustrated in the figure by dotted line 48.

According to FIG. 4 signal AB is phase shifted ninety degrees by phase shifter 17 and then added by summing circuit 18 to signal CD. A phase comparator 19 determines the phase of the resulting sum relative to the signal driving the coil 12. The result is a digital number that is made available to a microprocessor 33. The microprocessor 33 operates upon various phase measurements to produce an individual coordinate, according to the method summarized by FIG. 7. To this end, the microprocessor uses a memory (not shown) for both the storage of permanent processing routines and temporary intermediate results. Output coordinate data is made available upon a bus 34.

If switch 16 were set to its other position then signal EF would be shifted ninety degrees and added to signal GH, and the phase of *that* result would be supplied to the microprocessor. This brings us to considering exactly what X' and X" are.

Figure 5:
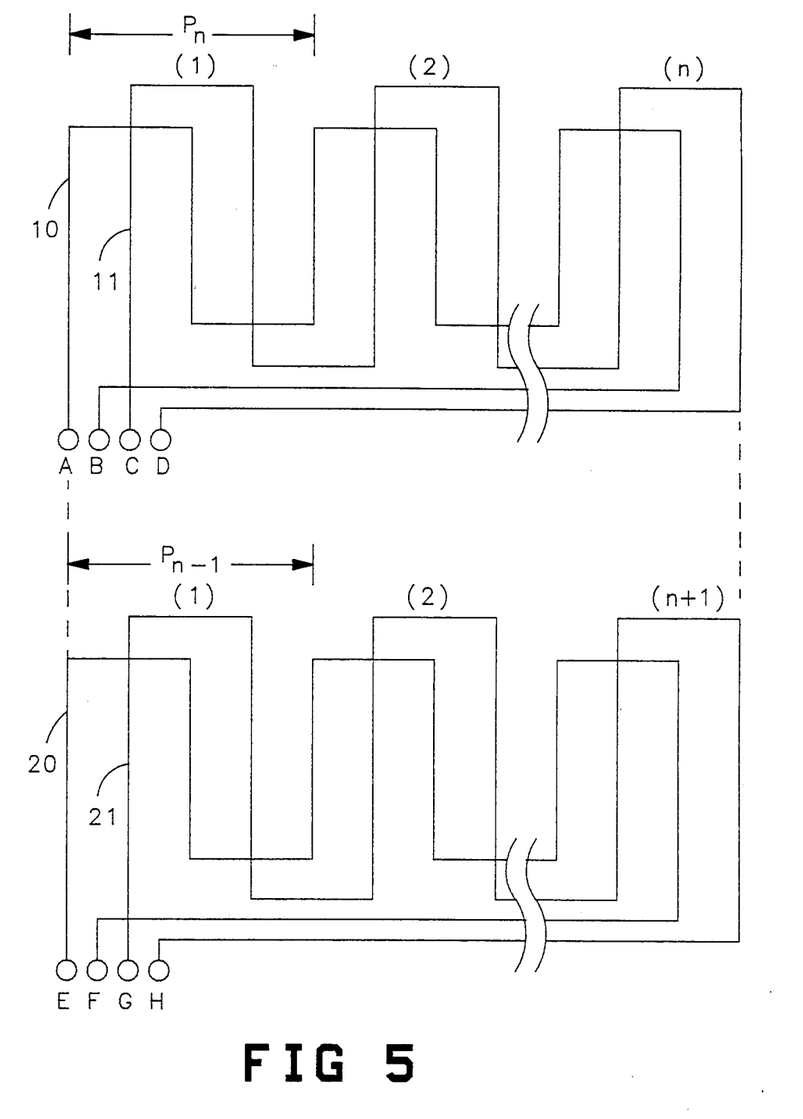

Now consider FIG. 5. Again, sense windings for only one coordinate axis (say, the abscissa) are shown. As in FIG. 3, sense windings 10 and 11 each contain n-many turns, or loops. When switch 16 of FIG. 4 connects sense windings 10 and 11 to the phase measurement circuitry the answer that obtains relates the effective center of the cursor or stylus to its location within the loop containing it, as if that loop were the only loop. If the effective center were one third of the way across the loop the resulting phase would be one hundred and twenty degrees. But this measurement does not reveal *which* loop contains the center; the exact same answer would result if the center were one third of the way across either loop to the left or right of the loop presently containing the center. That is, the resulting answer is but a modulo "fine" answer whose modulus in distance is the period of the loops embedded in the platen. It is necessary to find which loop contains the center, and augment the fine answer by the number of whole loops preceeding that loop.

It is for this purpose that the platen also contains a second pair of sense windings 20 and 21, either above or below, but in essentially the same plane as, windings 10 and 11. The output terminals of these windings are E, F, G, and H. The cursor drive signal produces in sense windings 20 and 21 signals EF and GH, respectively. Sense windings 20 and 21 are similar to windings 10 and 11, but are not identical thereto. Whereas windings 10 and 11 each have n loops, windings 20 and 21 have n+1. It can be shown that, except for the extremes of the platen, a given cursor position will produce a given modulo phase difference X' for signals AB and CD, and a *different* modulo phase difference X" for signals EF and GH. There is a one-to-one mapping that relates the difference between X' and X" to the actual absolute position of the cursor or stylus upon the platen. This is essentially the principle of the vernier.

Figure 6:
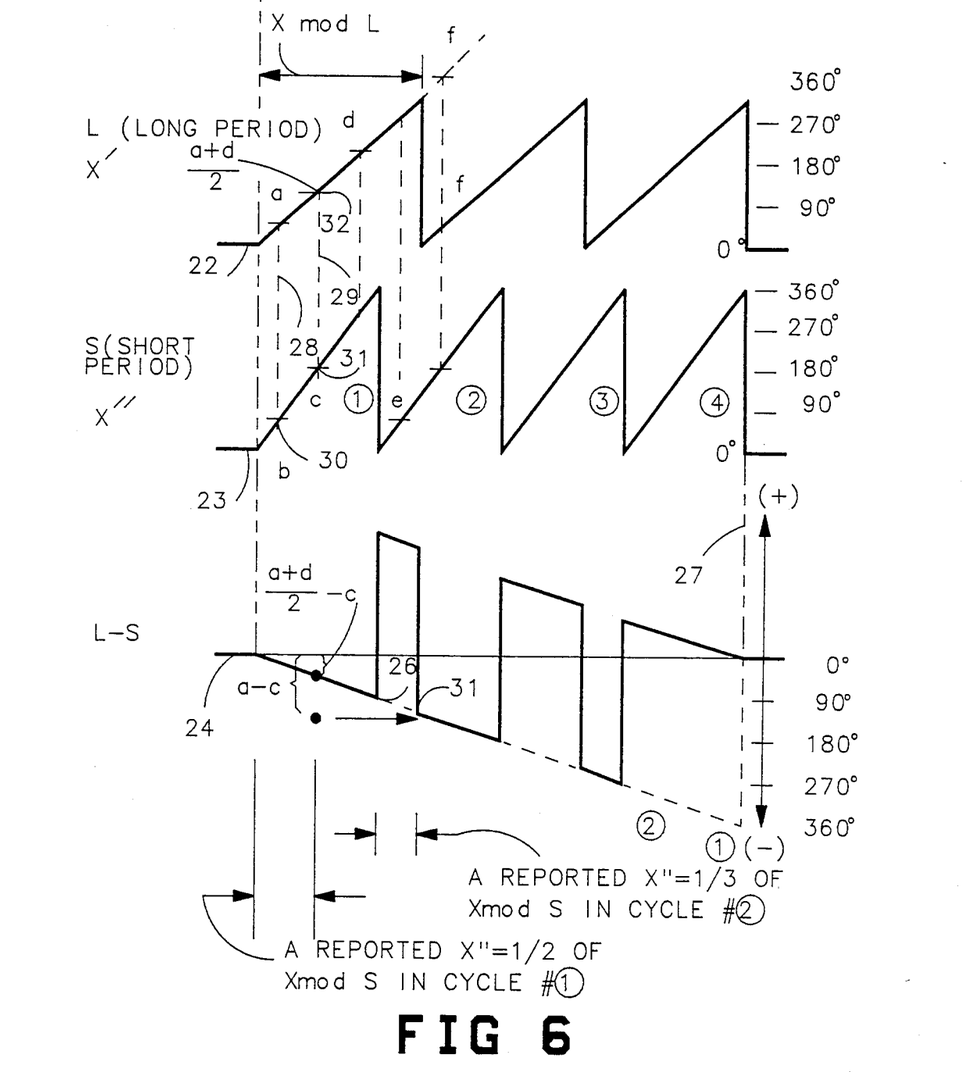
FIG. 6 is an explanation of how cursor or stylus motion can disturb the accuracy of the individual coordinate components measured according to the digitizing principles of FIGS. 3-5.

FIG. 6 illustrates how this mapping works. For the sake of simplicity, suppose that sense windings 10 and 11 each have three loops, while sense windings 20 and 21 each have four. Then the phase difference X' will roll through three cycles of three hundred and sixty degrees of phase as the cursor travels across the entire axis of the platen, while during the same excursion the phase difference X" will roll through four complete cycles of phase. FIG. 6 includes graphs 22 and 23 of the phase values of X' and X", respectively. The phase differences obtaining for each cursor position are shown for a platen with three and four loops in sense windings 10/11 and 20/21, respectivley. The physical period of the three X' windings is longer than that for the four X"windings. A captial letter "L" designates the longer period phase waveform, while an "S" designates the shorter period phase waveform. Assuming that an abscissa is to be measured, $X_{mod\ L}$ is the distance value corresponding to the loop-to-loop distance, for each of sense windings 10 and 11, along the platen in a direction parallel to the X axis.

FIG. 6 also illustrates a waveform 24 that is the algebraic difference L−S. At one extreme position 25 of the cursor both L and S are zero, so their difference is also zero. During subsequent motion along the axis the S waveform 23 (X") has a greater rate of change, so L−S is negative until a point 26 is reached. At point 26 S abruptly returns to zero, while L remains large. This produces a temporary positive excursion in waveform L−S 24. This lasts until L abruptly returns to zero; meanwhile S has been increasing, so that the difference continues to become more negative. It is a simple matter for the firmware of the microprocessor to identify the positive excursions and normalize them by subtracting out a unit three hundred and sixty degrees whenever the difference L−S 24 is positive. The positive excursions would then be replaced by the dotted line sections shown in the figure, resulting in a single cycle waveform going from zero degrees phase difference to three hundred and sixty degrees phase difference as the cursor or stylus moves from one extreme 25 to the other 27. We have described a decreasing L−S; an increasing S−L would have done just as well.

Normalized waveform 24 is taken as a coarse measurement that tells by how many modulo fine cycles to augment the fine measurement. More specifically, at a given fixed cursor position L and S have certain particular values. Suppose S is to be taken as the source of the fine measurement. The four cycles of S cause a division into four regions of the possible values of L−S. Values of S that are a part of the first cycle of S will map into the first fourth of L−S. Values of S that are part of the second cycle of S will map into the second four of L−S, and so on. Accordingly, the specific value of L−S that results from the certain particular values of L and S is examined to determine which fourth of its maximum value (i.e., its range) that difference lies within. That tells which cycle of S produced that difference. If, for example, certain particular values of L and S produced an L−S between 180 degrees and 270 degrees (the third quarter), then the digitized point lies within the third cycle of S, and one needs to add two full periods of $X_{mod\ S}$ to X" to obtain the actual absolute abscissa. The above described technique is known in itself, and works well enough when the cursor or stylus is stationary, or moving only very slowly.

We now use FIG. 6 to illustrate what goes wrong with the process described above when the cursor is moving at an appreciable rate in the direction of the axis to be measured. Suppose at time 28 the hardware measures X' and obtains a value a. Then switch 16 is set to its other position and another measurement taken at time 29 to produce an X" of c 31. But the X" value of c does not correspond to the X' value of a; only the X" value of b 30 would do that. Unfortunately, however, the motion of the cursor or stylus combined with the sequential taking of measurements ensures that a and c will result, and not a and b. This is indeed unfortunate, because a−c is, in our example, twice the correct value of a−b. What is worse, it is sufficiently far down the graph of L−S to cause an error in deciding which cycle of S contains the point being digitized. Point 31 on L−S corresponds to a point in the *second* cycle of S, while the points corresponding to a, b, and even c (!) are all in the *first* cycle of S. Such a mistake in the coarse measurement causes an intolerablely large error in the reported coordinate.

Here is how the invention avoids this difficulty. By measuring X', X", and then another X', followed by associating X" with the average of the two X' values, the X" value c 31 is associated with a value 32 that it *does* correspond to. Such correspondence produces a correct value of L−S; a value that is unaffected by the motion of the cursor or stylus.

Attention is drawn, however, to one additional potential pitfall. Suppose that in making the sequence of measurements X', X", X' the resulting values were d, e, and f, rather that a, b, and c. The values d and f are separated by an abrupt drop in value as the phase of X' rolled over from 360 degree to zero degrees. As measured, d and f cannot be averaged unless something is done to make them commensurable. One way to do that is to turn f into f' by adding back the abrupt decrease of 360 degrees. This is easily done by the firmware if it knows which way the cursor is moving, so that it can distinguish between the troublesome case of (d, e, f) and the legitimate case of (d, c, a) when the cursor is moving in the other direction.

Another way to distinguish d, e, and f from d, c, and a is to exploit the relative rapidity with which measurements can be performed in relation to how fast a human being can be expected to move the cursor. If, for example, the measurement sequence X', X", X' can be performed in less than three milliseconds, we can guarantee that two X' values are within the same cycle if: (1) their difference is less than half the peak value of L, *and* (2) the cursor velocity was not high enough to pass through more than half a period of $X_{mod\ L}$ during that three milliseconds. And finally, the firmware can retain the last known good coordinate pair and compare it to the latest one for sudden jumps in value of about one period. If such should occur in either coordinate that coordinate pair is discarded in favor of the next pair. This technique is particularly applicable to digitizers that continuously keep track of the location of the cursor, but report the location only upon request.

The Method of the Invention

Figure 7:
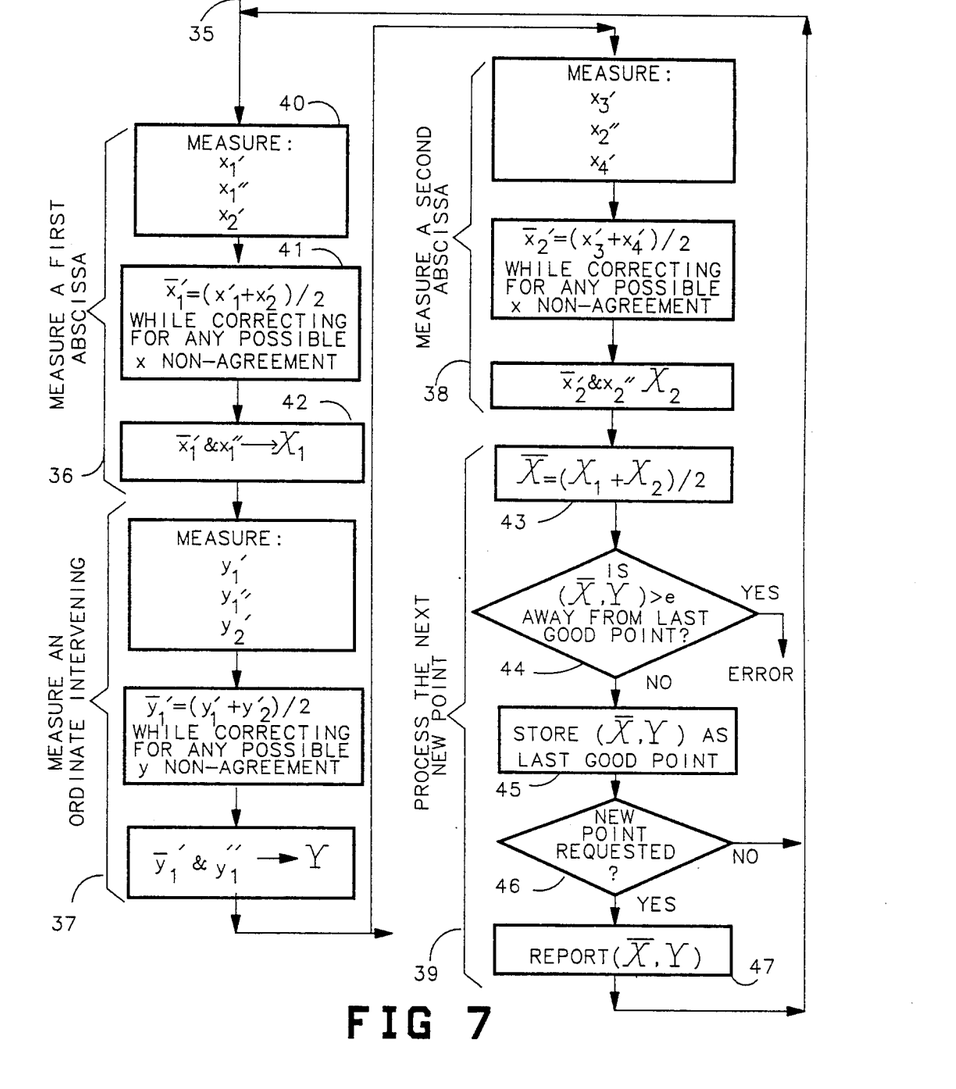
FIG. 7 is a simplified flowchart of how the principles of the invention cooperate when applied to two levels of measurement within the digitizing technique of FIGS. 3-6.

Refer now to FIG. 7, wherein is shown a simplified flowchart of the overall operation of the inventive method at two levels of measurement for each individual coordinate. The point of entry 35 into the flowchart is from an initial turn-on routine, or perhaps from an error recovery routine. Neither of those is shown. In its usual mode of operation the flowchart takes the form of a loop composed of four main activities 36-39. The first activity 36 is the measurement of a first abscissa. The second activity 37 is the measurement of an intervening ordinate. This is followed by the third activity 38, which is the measurement of a second abscissa. The fourth activity 39 is processing the previously measured abscissas and ordinate to obtain a new point.

Activities 36, 37, and 38 are similar to each other. To measure an abscissa, for example, two consecutive modulo fine x' components are measured about an intervening modulo fine x" component. This is shown as step 40. Although x' and x" are each modulo values of modulus three hundred and sixty degrees, each modulus corresponds to different lengths along the X axis. If there are N-many cycles of one modulus along the length of the axis, then there are M-many of the other, M being different from N by one. Following step 40, an average x' component is found by step 41, taking care to account for any any roll-over in the modulus that may have occurred between the two x' components. This produces an equivalent x' that correctly corresponds to the measured x". At step 42 the two components x" and the equivalent x' are examined according to the principle of the vernier to produce $X_1$. A corresponding process takes place for y' and y" values in activity 37, and the same process is repeated again for another set of x' and x" values in activity 38.

Activity 39 combines the abscissa and ordinate data found in steps 36, 37, and 38. In step 43 the final abscissa value is found by averaging $X_1$ and $X_2$. This produces an abscissa that can be correctly associated with the measured ordinate. At step 44 the proposed new coordinate values for this latest point are compared against those of the last good point. If the new point is unreasonably far away (say, epsilon is approximately equal to the physical period of the sense windings), then there has been an "error" of some sort. The "yes" branch of step 44 then sends control to an error handling routine (not shown). Excessive cursor velocity and lifting the cursor away from the platen and then returning it are two possible ways that such an error might occur. If the answer at step 44 is "no," then the next step 45 saves the proposed new point as the last good point. Following that, step 46 determines if the coordinates of a new point have been requested by the user. If not, the measurement loop is simply repeated. If new coordinates have been requested step 47 reports them and then repeats the measurement loop.

I claim:

1. A digitizer of pairs of first and second coordinates, the digitizer comprising:
   first means for digitizing at times T and T plus twice delta T respective first and second values of a first coordinate;
   second means for digitizing at a time T plus delta T a first value of a second coordinate;
   third means, coupled to the first means, for averaging the first and second values of the first coordinate; and
   means, coupled to the second and third means, for reporting the coordinate pair comprising the average of the first and second values of the first coordinate paired with the first value of the second coordinate.

2. A method of compensating digitized Cartesian coordinates for errors introduced by cursor motion, the method comprising the steps of:
   (a) digitizing a value of a first coordinate;
   (b) subsequently digitizing a value of a second coordinate;
   (c) then again digitizing a value of the first coordinate at a time producing equal time intervals between steps a and b and steps b and c;
   (d) averaging the values obtained by steps a and c; and
   (e) associating the average value of the first coordinate produced by step d with the value of the second coordinate obtained by step b.

3. Apparatus for digitizing a coordinate that can vary from a value of zero to a maximum value of L, the apparatus comprising:
   means for generating timing signals indicative of an ordered sequence of times $T_1$, $T_2$, and $T_3$ separated by equal time intervals;
   first measurement means, coupled to the timing signals, for measuring according to a modulus Q corresponding to L/N, where N is an integer, a first modulo value for the coordinate at time $T_1$ and a third modulo value for the coordinate at time $T_3$;
   second measurement means, coupled to the timing signals, for measuring according to the same modulus Q but corresponding now to L/M, where M is an integer differing from N by one, a second modulo value for the coordinate at time $T_2$;
   averaging means, responsive to the first and third modulo values, for producing the average thereof; and
   difference means, responsive to the average and the second modulo value, for producing the difference therebetween as a lower resolution indication of the coordinate value.

4. Apparatus as in claim 3, further comprising means, responsive to the difference and the average, for producing a higher resolution coordinate value by using the difference as an indication of how many instances of the fraction L/N to add to the quotient of the average divided by the product QL.

5. Apparatus as in claim 3, further comprising means, responsive to the difference and the second modulo value, for producing a higher resolution coordinate value by using the difference as an indication of how many instances of the fraction L/M to add to the quotient of the second modulo value divided by the product QL.

6. A method of digitizing a coordinate value along a coordinate axis of length L, the method comprising this sequence of steps:
   (a) measuring a fine value of a coordinate according to a modulus Q corresponding to N-many complete cycles of the modulus in the length L of the coordinate axis;
   (b) measuring a fine value of the coordinate according to the same modulus Q, but now corresponding to M-many complete cycles of the modulus in the length L, M different from N by one;
   (c) measuring another fine value of the coordinate according to the modulus Q again corresponding to N-many modulo cycles in the length L, this step being performed at a time producing equal time intervals between steps a and b and steps b and c;
   (d) averaging the fine measurements obtained by steps a and c to produce an average fine value;
   (e) determining a coarse value according to the difference between the measurement of step b and the average produced in step d;
   (f) combining the coarse value determined in step e with a fine value to produce a coordinate value along the length of the coordinate axis.

7. A method of digitizing a coordinate pair while employing the method of claim 6, the method comprising this sequence of steps:

(a) digitizing a first value of one coordinate of the pair according to the method of claim 6;
(b) digitizing a value of the other coordinate of the pair according to the method of claim 6;
(c) digitizing a second value of the one coordinate of the pair according to the method of claim 6, this step being performed at a time producing equal time intervals between steps a and b and steps b and c;
(d) averaging the first and second values of the one coordinate; and
(e) associating the average of step d with the value of the other coordinate digitized in step b, said association forming the coordinate pair.

* * * * *